United States Patent
Kim et al.

(10) Patent No.: US 10,134,100 B2
(45) Date of Patent: Nov. 20, 2018

(54) WATERMARK EMBEDDING APPARATUS AND METHOD THROUGH IMAGE STRUCTURE CONVERSION

(71) Applicant: MARKANY INC., Seoul (KR)

(72) Inventors: So Won Kim, Seoul (KR); Tai Yoon Lee, Seoul (KR); Dong Young Lee, Seoul (KR); Gyeong Gi Noh, Incheon (KR); Min Soo Park, Uiwang-si (KR); Ji Seop Moon, Seoul (KR)

(73) Assignee: MARKANY INC., Seoul (KR)

( * ) Notice: Subject to any disclaimer, the term of this patent is extended or adjusted under 35 U.S.C. 154(b) by 0 days.

(21) Appl. No.: 15/435,306

(22) Filed: Feb. 17, 2017

(65) Prior Publication Data
US 2018/0232843 A1 Aug. 16, 2018

(30) Foreign Application Priority Data
Feb. 13, 2017 (KR) .......................... 10-2017-0019530

(51) Int. Cl.
*G06K 9/00* (2006.01)
*G06T 1/00* (2006.01)
(Continued)

(52) U.S. Cl.
CPC ............ *G06T 1/005* (2013.01); *G06T 1/0021* (2013.01); *H04N 1/32144* (2013.01); *H04N 19/114* (2014.11); *H04N 19/159* (2014.11); *H04N 19/172* (2014.11); *H04N 19/177* (2014.11); *H04N 19/467* (2014.11); *H04N 19/593* (2014.11); *H04N 21/8358* (2013.01); *G06K 9/00711* (2013.01); *G06T 1/0035* (2013.01); *G06T 2201/0053* (2013.01); *H04N 1/32149* (2013.01); *H04N 19/105* (2014.11)

(58) Field of Classification Search
CPC .............................. H04N 19/00; G01L 19/00
USPC ................. 382/100; 375/240.27; 380/51, 54; 713/176
See application file for complete search history.

(56) References Cited

U.S. PATENT DOCUMENTS 6,373,960 B1 * 4/2002 Conover ............... G06T 1/0035
348/412.1
7,124,298 B2 * 10/2006 Beekmans .............. G06T 1/005
713/176
(Continued)

FOREIGN PATENT DOCUMENTS

| JP | 2009260436 A | 11/2009 |
|---|---|---|
| WO | 98/31152 A2 | 7/1998 |
| WO | 2009/036684 A1 | 3/2009 |

OTHER PUBLICATIONS

Extended European Search Report dated Jun. 7, 2017, Application No. 17156845.4.

*Primary Examiner* — Abolfazl Tabatabai
(74) *Attorney, Agent, or Firm* — Envision USA Inc.

(57) ABSTRACT

One aspect of the present invention discloses a watermark embedding method. The method includes: inputting an original bitstream; determining a first frame for embedding a watermark in the input original bitstream; selecting one of frames after the first frame as a second frame; generating the first frame a bidirectional-coded frame (B frame) referring to the second frame; generating the second frame as a reference frame of the first frame; and embedding the watermark in the first frame generated as the B frame.

16 Claims, 12 Drawing Sheets

(51) Int. Cl.
*H04N 1/32* (2006.01)
*H04N 21/8358* (2011.01)
*H04N 19/467* (2014.01)
*H04N 19/114* (2014.01)
*H04N 19/159* (2014.01)
*H04N 19/172* (2014.01)
*H04N 19/177* (2014.01)
*H04N 19/593* (2014.01)
*G06F 21/16* (2013.01)
*H04N 19/105* (2014.01)

(56) References Cited

U.S. PATENT DOCUMENTS

| 7,154,560 B1 * | 12/2006 | Chang .................. G06T 1/0028 |
| | | 348/598 |
| 2014/0301486 A1 | 10/2014 | Liao et al. |
| 2016/0210971 A1 | 7/2016 | Adsumilli |
| 2016/0337675 A1 | 11/2016 | Mutton |

* cited by examiner

FIG. 10

Case 1

| Frame Index | 810 | ↑ | ↑ |
|---|---|---|---|
| Frame Type | — | ↑ | B |
| Packet Size | 170814 Byte | ↑ | 52809 Byte |

| Frame Index | 810 | ↑ | ↑ |
|---|---|---|---|
| Frame Type | P | ↑ | — |
| Packet Size | 40074 Byte | ↑ | 196843 Byte |

Case 2

| Frame Index | 4726 | ↑ | ↑ |
|---|---|---|---|
| Frame Type | — | ↑ | B |
| Packet Size | 80736 Byte | ↑ | 51583 Byte |

| Frame Index | 4726 | ↑ | ↑ |
|---|---|---|---|
| Frame Type | P | ↑ | — |
| Packet Size | 59776 Byte | ↑ | 84654 Byte |

Case 3

| Frame Index | 5037 | ↑ | ↑ |
|---|---|---|---|
| Frame Type | — | ↑ | B |
| Packet Size | 63419 Byte | ↑ | 43558 Byte |

| Frame Index | 5037 | ↑ | ↑ |
|---|---|---|---|
| Frame Type | P | ↑ | — |
| Packet Size | 43125 Byte | ↑ | 59155 Byte |

Case 4

| Frame Index | 5135 | ↑ | ↑ |
|---|---|---|---|
| Frame Type | — | ↑ | B |
| Packet Size | 119981 Byte | ↑ | 45731 Byte |

| Frame Index | 5135 | ↑ | ↑ |
|---|---|---|---|
| Frame Type | P | ↑ | — |
| Packet Size | 57318 Byte | ↑ | 119907 Byte |

FIG. 11

| Original video size (format = h264) | | Embedding video size (qp -= 5) | increase | Rate |
|---|---|---|---|---|
| 494 MB | → | → 503 MB | 9 MB | 2% |

WATERMARK EMBEDDING APPARATUS AND METHOD THROUGH IMAGE STRUCTURE CONVERSION

This application claims the benefit of priority of Korean Patent Application No. 10-2017-0019530 filed on Feb. 13, 2017, which is incorporated by reference in its entirety herein.

BACKGROUND OF THE INVENTION

Field of the Invention

The present invention relates to a watermark embedding apparatus and a watermark embedding method, and more particularly, to a watermark embedding apparatus and a watermark embedding method for efficiently enhancing robustness of watermark insertion.

Discussion of the Related Art

Digital watermarking is a technique used for protecting copyrights and determining forgery of digital contents by embedding non-cognitive unique information in various literary productions including an audio, an image, a moving picture, and the like and enabling tracking the literary productions through extraction of the embedded information afterwards. In particular, a trend that illegal outflow and distribution of moving picture contents such as a movie or a TV broadcast rapidly increase is shown, and as a result, as a countermeasure against, a watermark technique is emerging.

FIG. 1A is a basic conceptual view of watermark embedding.

Referring to FIG. 1A, the watermark embedding apparatus generates a watermarked image I' by embedding a watermark pattern in an image I input within a range in which an original is audiovisually similarly viewed by configuring a watermark pattern W. In this case, watermark information is modulated by using a secret/public key K to generate a watermark pattern having the same size as an original image. The secret key is used for a purpose of preventing the watermark information from being interpreted by an authorized user and preventing the watermark and another watermark from interfering with each other by allowing the watermark patterns of both watermarks to be orthogonal to each other when another watermark is inserted into contents in which the watermark is already embedded by using the same watermark technique.

FIG. 1B is a basic conceptual view of watermark detection.

Referring to FIG. 1B, a watermark detecting apparatus may detect a watermark through the secret/public key K by receiving a test image I'. In this case, it is determined whether the detected watermark is the same as the watermark W originally embedded by the embedding apparatus to determine whether to attack the corresponding image.

The contents in which the watermark is embedded are intentionally or unintentionally attacked under various environments and need to have robustness to survive even after being attacked. In the case of the moving picture contents, the moving picture contents are subjected to a compression operation several times until the moving picture contents are transferred from a content provider to the user and each step is performed through lossy compression, and as a result, an embedded watermark signal cannot be avoided. Moreover, in recent years, with the development of compression technology, as compression efficiency has further increased, a risk of the watermark signal embedded in a low-frequency band has been further increased in a compression step in order to secure invisibility.

The compression is naturally performed in a transmission step, while a compression attack having a malicious purpose is even stronger in compression strength, and as a result, a countermeasure associated with moving picture compression for securing the robustness of the watermark is required.

As moving picture encoding, a method is primarily used, which decides a key frame through conditions including a scenecut among several consecutive frames, and the like and thereafter, encodes only a difference value from similar frames. In this case, the key frame is subjected to lossless compression and since other frames which refer to the key frame may not have a lot of information, compression of other frames becomes the lossy compression. When the watermark signal is to be embedded in the frame in which the lossy compression is performed, almost most signals disappear, and as a result, it is difficult to detect the watermark.

SUMMARY OF THE INVENTION

An object of the present invention is to provide a watermark embedding method and a watermark embedding apparatus which performs a structural change of a bitstream before embedding a watermark in order to enhance robustness of the watermark.

In accordance with an embodiment of the present invention, a watermark embedding method may include: inputting an original bitstream; determining a first frame for embedding a watermark in the input original bitstream; selecting one of frames after the first frame as a second frame; generating the first frame a bidirectional-coded frame (B frame) referring to the second frame; generating the second frame as a reference frame of the first frame; and embedding the watermark in the first frame generated as the B frame.

The generating of the second frame as a reference frame of the first frame may comprises generating the second frame as an intra-coded frame (I frame).

The first frame may be a scenecut frame or the I frame in the original bitstream.

In a GoP structure changed by changing a reference relationship of the first frame and the second frame, the first frame generated as the B frame may refer to the second frame in another GoP by activating a function to refer to another GoP.

When the first frame is generated as the B frame, the GoP structure may be changed so that the first frame generated as the B frame belongs to a first GoP which is the previous GoP of a second group of picture (GoP) to which the first frame belongs in the original bitstream.

The GoP structure may be changed by changing and setting the first GoP to the extent of a frame immediately before the second frame.

The second frame may be a frame immediately after the first frame.

The determining of the first frame for embedding the watermark in the input original bitstream may include selecting input image frames in the original bitstream by the unit of n frames while shifting the input image frames at the interval of h frames, extracting a candidate frame of the selected n frames by using at least one of a plurality of codecs and scenecut detection algorithms, detecting a frame having a count value larger than a threshold value as a final scenecut frame through histogram analysis based on the detected candidate frame, and determining the detected final scenecut frame as the first frame, and h and n may be real numbers larger than 0 and h may have a smaller value than n.

In accordance with another embodiment of the present invention, a watermark embedding apparatus may include: an input unit inputting an original bitstream; an embedding frame determining unit determining a first frame for embedding a watermark in the input original bitstream; a reference frame selecting unit selecting one of frames after the first frame as a second frame; a reference frame generating unit generating the second frame as a reference frame of the first frame; a frame changing unit generating the first frame as a bidirectional-coded frame (B frame) referring to the second frame; and a watermark embedding unit embedding the watermark in the first frame generated as the B frame.

The reference frame generating unit may generate the second frame as an intra-coded frame (I frame).

The first frame may be a scenecut frame or the I frame in the original bitstream.

In a GoP structure changed by changing a reference relationship of the first frame and the second frame, the first frame generated as the B frame may refer to the second frame in another GoP by activating a function to refer to another GoP.

When the first frame is generated as the B frame, the GoP structure may be changed so that the first frame generated as the B frame belongs to a first GoP which is the previous GoP of a second group of picture (GoP) to which the first frame belongs in the original bitstream.

The GoP structure may be changed by changing and setting the first GoP to the extent of a frame immediately before the second frame.

The second frame may be a frame immediately after the first frame.

The embedding frame determining unit may include an image selecting unit selecting an input image frames in the original bitstream by the unit of n frames while shifting the input image frames at the interval of h frames, a candidate frame extracting unit extracting a candidate frame of the selected n frames by using at least one of a plurality of codecs and scenecut detection algorithms, and a final frame detecting unit detecting a frame having a count value larger than a threshold value as a final scenecut frame through histogram analysis based on the detected candidate frame, the detected final scenecut frame is determined as the first frame, and h and n may be real numbers larger than 0 and h may have a smaller value than n.

By a watermark embedding method and a watermark embedding apparatus according to one aspect of the present invention, since an embedding position of a watermark can be determined for the first time, an increase in capacity is minimized and detection rate is enhanced.

BRIEF DESCRIPTION OF THE DRAWINGS

FIG. 10 is a table for comparing a change in capacity through type conversion of an I frame and the subsequent frame by a watermark embedding method according to an embodiment of the present invention;
and
FIG. 11 is a table for comparing a capacity variation of an image in which a watermark is embedded and an original image by the watermark embedding method according to the embodiment of the present invention.

DETAILED DESCRIPTION OF THE EMBODIMENTS

Figure 1A:
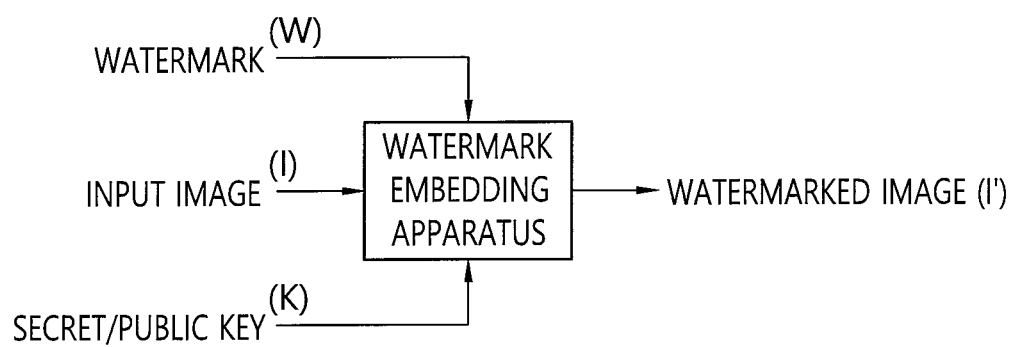
FIG. 1A is a schematic view of watermark embedding.
Figure 1B:
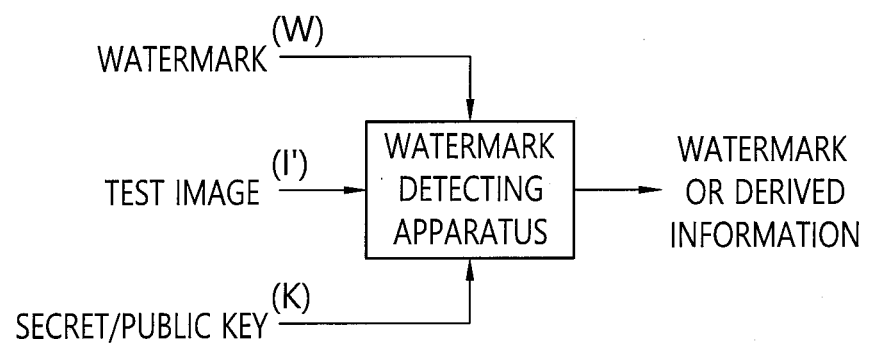
FIG. 1B is a schematic view of watermark detection.

The present invention may have various modifications and various embodiments and specific embodiments will be illustrated in the drawings and described in detail.

However, this does not limit the present invention to specific embodiments, and it should be understood that the present invention covers all the modifications, equivalents and replacements included within the idea and technical scope of the present invention.

Terms such as first, second, and the like may be used to describe various components and the components should not be limited by the terms. The terms are used only to discriminate one constituent element from another component. For example, a first component may be referred to as a second component, and similarly, the second component may be referred to as the first component without departing from the scope of the present invention. A term 'and/or' includes a combination of a plurality of associated disclosed items or any item of the plurality of associated disclosed items.

It should be understood that, when it is described that a component is "connected to" or "accesses" another component, the component may be directly connected to or access the other component or a third component may be present therebetween. In contrast, it should be understood that, when it is described that an element is "directly connected to" or "directly access" another element, it is understood that no element is present between the element and another element.

Terms used in the present application are used only to describe specific embodiments, and are not intended to limit the present invention. A singular form may include a plural form if there is no clearly opposite meaning in the context. In the present application, it should be understood that term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

If it is not contrarily defined, all terms used herein including technological or scientific terms have the same meanings as those generally understood by a person with ordinary skill in the art. Terms which are defined in a generally used dictionary should be interpreted to have the same meaning as the meaning in the context of the related art, and are not interpreted as an ideal meaning or excessively formal meanings unless clearly defined in the present application.

Hereinafter, preferred embodiments of the present invention will be described in detail with reference to the accompanying drawings. In describing the present invention, like reference numerals refer to like elements in the drawings for easy overall understanding and a duplicated description of like elements will be omitted.

Throughout the present specification, a group of picture (GoP) as a basic unit of coding/edition include at least one I frame and may be generally constituted by 10 to 15 frames. It is preferable that the GOP starts with the I frame or a B frame and ends with the I or B frame and when the GoP starts with the B frame, the GoP may be reconstructed by referring to the subsequent I frame.

The intra-coded frame means a frame decoded without referring to another picture by intra prediction and P and B frames mean frames decoded by referring other pictures, which include the I frame. Herein, the predictive-coded frame (P frame) means a frame that refers a unidirectional frame and the bidirectional-coded frame (B frame) means a frame that refers a bidirectional frame.

The picture and the frame as terms designating individual images may be used mixedly with each other.

Further, a watermark embedding apparatus according to an embodiment of the present invention may be implemented by user terminals such as a content provider server providing contents through a network, a settop box, and a PC, and the like.

Embedding Watermark in I Frame

Figure 2:
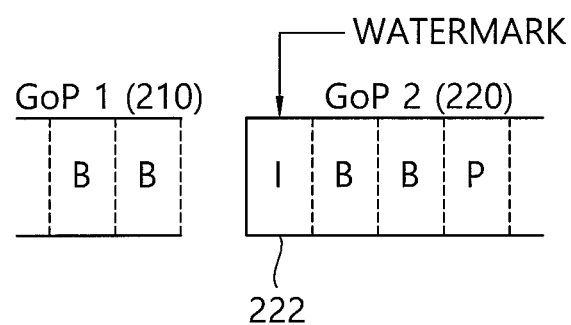
FIG. 2 is a schematic view for describing a method for embedding a watermark in an I frame.

FIG. 2 is a schematic view for describing a method for embedding a watermark in an I frame.

Referring to FIG. 2, there are a lot of cases in that in an image, a scenecut frame and/or a key frame of the image are the I frames. Therefore, the I frame may be more robust to an attack or fake of the image than other frames. The reason is that since the scenecut frame is substantially important information, the scenecut frame is generally designated as the I frame in the image.

In the embodiment of FIG. 2, a situation in which the watermark is embedded in an I frame 222 which is almost lossless is assumed. In this case, GoP 1 210 ends with the B frame and thereafter, there is a high possibility that the first frame of GoP 2 220 will be the scenecut frame. Accordingly, the I frame 222 is general.

In this case, when the watermark is embedded in the I frame 22 which will be the scene switching frame with a high probability, a probability that the watermark will survive is high, but reencoding is required and the B and P frames in the GoP 2 220 generally directly/indirectly refer to the I frame 222, and as a result, the number of frames transformed also increases with transformation of the I frame 222, thereby increasing encoding complexity. Further, since a lot of bit rate is allocated in the order of the I, P, and B frames in image compression, when the watermark is embedded in the I frame 222, there is a high possibility that significant damage will be made in terms of the capacity and the bit rate of the image.

Embedding of Watermark with Conversion of Frame Type

Figure 3:
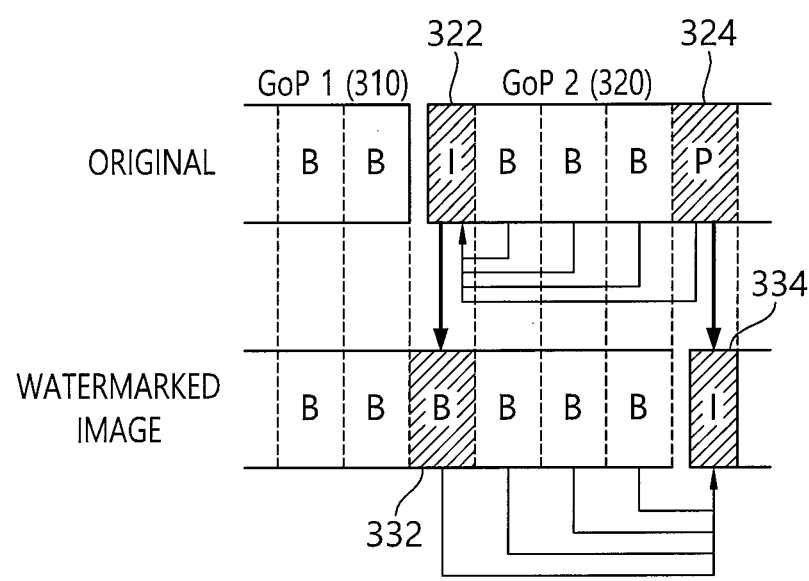
FIG. 3 is a schematic view for describing for a method for changing a watermark embedding target frame into a B frame by a watermark embedding method according to an embodiment of the present invention.

FIG. 3 is a schematic view for describing for a method for changing a watermark embedding target frame into a B frame by a watermark embedding method according to an embodiment of the present invention.

Referring to FIG. 3, when an original bitstream is embedded in the watermark embedding apparatus, the watermark embedding apparatus determines a target frame for embedding the watermark and recompresses the determined target frame. In this case, the watermark embedding target frame is preferably the scenecut frame and/or the I frame in the GoP. However, the watermark embedding target frame is not particularly limited thereto and the P frame is also selectable.

As described above, when the scenecut frame is a variable GoP, there is a high possibility that the scenecut frame will be the I frame and when the scenecut frame is a fixed GoP, there is a high possibility that the scenecut frame will be the I or P frame.

In the embodiment of the present invention, the watermark embedding apparatus may select an I frame 322 which is the first frame of a GoP 2 320 as the target frame for embedding the watermark. Since detection of the scenecut frame or the I frame occupies an important part in watermark embedding efficiency of the present invention, a method for more accurately detecting the scenecut frame or the I frame is required and the method will be described below in more detail with reference to FIGS. 7 to 9.

Moreover, in the embodiment of the present invention, the watermark embedding apparatus preferably embeds a watermark robust to a deterioration attack in each frame by generating the watermark with a frame based watermark. To this end, it is preferable to prevent a watermark corresponding to noise from being lost and compressed while encoding by analyzing a feature of the frame. Accordingly, it is preferable to embed the watermark in a part corresponding to a low frequency in a discrete cosine transform (DCT) filtering process which is one process of the encoding. Alternatively, the robustness may be increased by embedding the robust watermark in an edge of the image or an area not well viewed by a person.

When the watermark embedding apparatus selects the I frame 322 as the target frame in which the watermark will be embedded, the watermark embedding apparatus forcibly encodes the I frame 322 into a B frame 332 in order to prevent the capacity of the image from being increased and increase bit rate efficiency.

If the watermark embedding target frame is the P frame, since multiple similar frames exist in the same GoP, a next frame may be just changed to the p frame and a separate additional work is not required. However, as described in the embodiment of FIG. 3, when the embedding target frame is the I frame, the GoP is double-speed up forward, and as a result, encoding efficiency significantly deteriorates. The reason is that since there is no similar frame in the same GoP, an area to be referred does not exist, and as a result, all most areas may be determined as an intra-coded area. Therefore, while the I frame is forcibly changed to the B frame 332 and the B frame 332 is enabled to refer to another GoP, one frame 324 among frames disposed later is changed to the I frame 334 and thereafter, the corresponding frame 334 is allowed to be referred, thereby increasing encoding efficiency.

When this is described in detail, in the original bitstream, a predetermined frame 324 after the I frame 322 which is the embedding target frame is selected to encode the selected frame into the I frame 334. In this case, the frame 324 selected for type conversion of the frame in the original bitstream is not limited to the P frame and the B frame is also available and the frame 324 need not be particularly changed to the I frame. The P frame including a lot of intra prediction may also be used.

When such frame type conversion is achieved, the B frame 332 into which the I frame 322 is frame-type converted belongs to the GoP 1 310 which is the previous GoP of the GoP 2 320 to which the B frame 332 belongs in the original bitstream and while the P frame 324 selected for type conversion into the I frame is encoded into the I frame 334, the P frame 324 becomes the first frame in the GoP 2 320 which is the subsequent GoP of the GoP 1 to which the previous B frame 332 belongs. Further, the GoP 1 310 may include even the previous frame (B frame) of the I frame 334.

In this case, since the I frame 334 into which the P frame 323 is frame-type converted is converted to serve as a reference frame of the B frame 332, the B frame 332 in the watermarked image refers to the I frame 334 of not the GoP to which the B frame 332 belongs but the GoP 2 320. In order to smoothly induce this case, it is preferable to use an open GoP option which may have a reference relationship over a GoP unit. Further, the B frames in the GoP 2 320 which refers to the I frame 322 in the original stream is also encoded by resetting the reference relationship so as to refer to the I frame 334 reencoded while the P frame 334 is frame-type converted in the watermarked image.

Figure 4:
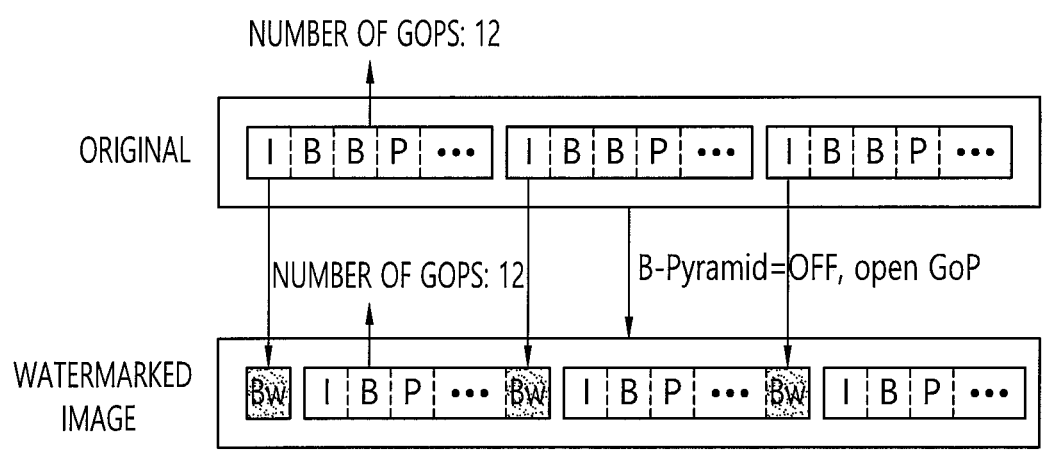
FIG. 4 is a schematic view for describing for the method for changing the watermark embedding target frame into the B frame when there is a limit in the number of GOPs in the watermark embedding method according to the embodiment of the present invention.

FIG. 4 is a schematic view for describing for the method for changing the watermark embedding target frame into the B frame when there is a limit in the number of GOPs in the watermark embedding method according to the embodiment of the present invention.

Referring to FIG. 4, the watermark embedding apparatus forcibly sets a frame in which the watermark embedding apparatus wants to embed the watermark as the B frame and sets the B frame as an end frame of the GoP. In some cases, protocols such as HTTP live streaming (HLS) used over the top (OTT) and dynamic adaptive streaming over HTTP (DASH) or the GoP in a live broadcast may be forcibly determined. In the embodiment of FIG. 4, it is assumed that the GoP is fixed to 12.

In the case of the OTT, in the original bitstream, the I frame may be arbitrarily encoded into the B frame and the immediately next frame may be encoded into the I frame. Since the frame which is shown immediately after the I frame is a frame which is most similar to the I frame, when the frame is forcibly encoded into the I frame, the encoded I frame may not significantly influence overall image encoding. In addition, when the immediately next frame is changed to the I frame, only the B frame (expressed as Bw in FIG. 4) in which the watermark is embedded is included in the previous GoP and all GoPs may continuously maintain the size of the GoP while only one frame is pushed. In the case of the live broadcast, one GoP is wholly encoded and only one frame is referred in the next GoP and thereafter, when the size of the corresponding GoP is determined, it is possible to sufficiently embed the watermark.

Moreover, such a filtering operation is configured so as to prevent another frame from referring to information on the B frame because the information on the B frame is broken by embedding the watermark in the B frame and controlling B-pyramid and OpenGoP options.

According to another embodiment of the present invention, the watermark may be embedded in an environment in which the frame is forcibly changed by configuring frame types of 12 respective frames constituting the GoP to be arranged in a specific frame type order. Further, a filtering operation may be performed, which embeds and encodes the watermark by a quantization parameter (QP) value of the I frame in which the watermark is embedded so as to allow the watermark to survive in various deterioration codomains.

Configuration of Watermark Embedding Apparatus

Figure 5:
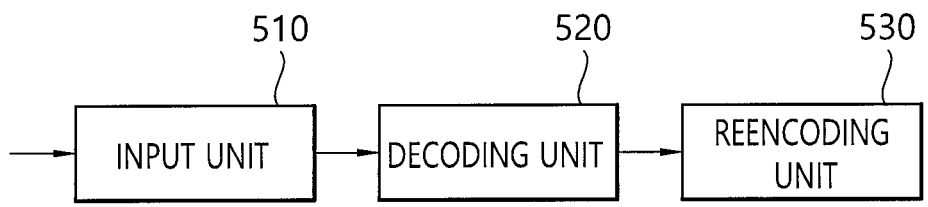
FIG. 5 is a block diagram schematically illustrating a watermark embedding apparatus according to an embodiment of the present invention.

FIG. 5 is a block diagram schematically illustrating a watermark embedding apparatus according to an embodiment of the present invention. Referring to FIG. 5, the watermark embedding apparatus may include an input unit 510, a decoding unit 520, and a re-encoding unit 530. Respective constituent elements may be implemented by one hardware processor and a plurality of constituent elements may be integrally implemented by one hardware processor. Further, commands or data related with the respective constituent elements are stored in a memory (not illustrated) connected with a processor and the related data may be provided to the processor.

Referring to FIG. 5, the input unit 510 receives an original bit stream.

The decoding unit 520 decodes the original bit stream input through the input unit 510 to acquire information on each frame.

The re-encoding unit 530 determines a watermark embedding target frame based on the decoded frame to convert a frame type of the corresponding frame into a B frame, and then embeds the watermark. In addition, one of subsequent frames of the embedding target frame is selected and the selected frame is converted into a I or P frame and then encoded by newly setting a reference relation according to a GoP structure changed according to the converted frame. The more detailed contents for the configuration of the re-encoding unit 530 will be described with reference to FIG. 6.

In the embodiment of the present invention, except for the decoding unit 520, while the decoding for all frames is not performed, a type change of the frame and the watermark embedding process may be performed by the re-encoding unit 530.

Figure 6:
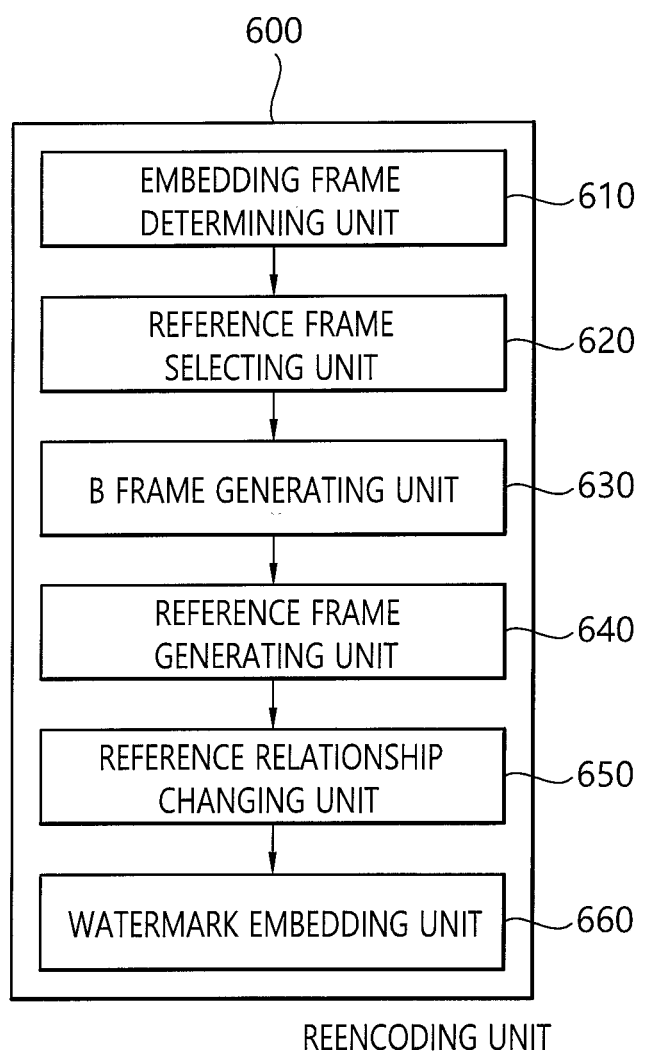
FIG. 6 is a detailed block diagram illustrating, in detail, a reencoding unit of the watermark embedding apparatus according to the embodiment of the present invention.

FIG. 6 is a detailed block diagram illustrating, in detail, the re-encoding unit of the watermark embedding apparatus according to the embodiment of the present invention. As illustrated in FIG. 6, the re-encoding unit according to the embodiment of the present invention may include an embedding frame determining unit 610, a reference frame selecting unit 620, a B frame generating unit 630, a reference frame generating unit 640, a reference relation changing unit 650, and a watermark embedding unit 660.

Referring to FIG. 6, the embedding frame determining unit 610 determines a target frame for embedding the watermark in the original bit stream input through the input unit (not illustrated). The embedding target frame may select a scenecut frame.

The reference frame selecting unit 620 selects one of the subsequent frames of the embedding target frame determined in the embedding frame determining unit 610 as a target to be converted into an I frame to be referenced by the embedding target frame. The reference frame selecting unit 620 may select a frame immediately next to the embedding target frame as a reference frame so as to minimize a change in the reference relation with high similarity to the embedding target frame.

The B frame generating unit 630 encodes arbitrarily the embedding target frame determined in the embedding frame determining unit 610 to a B frame. The B frame changes reference information to refer to the frame selected in the reference frame selecting unit 620. That is, reference target frame index information and reference block information referring for each coding block and/or prediction block may be changed according to the changed GoP structure.

The reference frame generating unit 640 generates the frame selected in the reference frame selecting unit 620 as an I frame and/or a plurality of P frame including intra prediction.

The reference relation changing unit 650 changes the reference relation of the frames that refer to the embedding target frame which has been an I frame before changing the frame type to change the reference relation of each frame to refer to the frame (the frame of which the frame type is changed to the I frame) selected in the reference frame selecting unit 620.

The watermark embedding unit 660 embeds the watermark in the B frame generated in the B frame generating unit 630.

Method of Detecting Accurate Scenecut Frame

Figure 7:
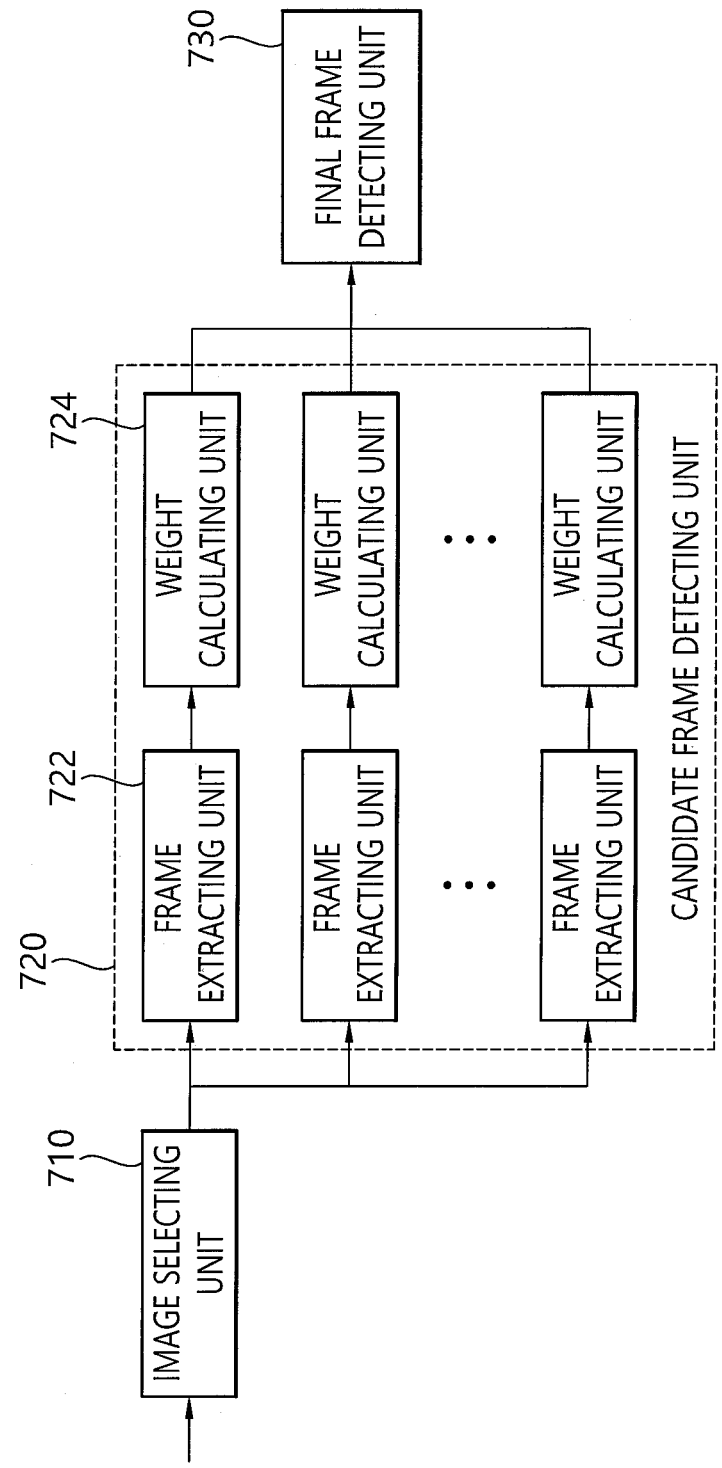
FIG. 7 is a detailed block diagram illustrating, in detail, an embedding frame determining unit of the watermark embedding apparatus according to the embodiment of the present invention.

FIG. 7 is a detailed block diagram illustrating, in detail, the embedding frame determining unit of the watermark embedding apparatus according to the embodiment of the present invention. As described in FIG. 7, the embedding frame determining unit according to the embodiment of the present invention may include an image selecting unit 710, a candidate frame detecting unit 720, and a final frame detecting unit 730.

Referring to FIG. 7, the watermark embedding apparatus receives a moving picture bit stream to detect a scenecut frame in the bit stream and may select the scenecut frame as a target frame for embedding the watermark. As described above, the scenecut frame and the I frame as the key frame of the image are strong against the attack on the image and thus finding accurately the frames is important in enhancing robustness of embedding the watermark. The watermark embedding apparatus intends to select such a scenecut frame or the I frame as the key frame as a target frame arbitrarily converted to the B frame.

The image selecting unit 710 receives the inputted moving picture stream to divide and select the inputted moving picture stream into specific units. The image selecting unit 710 selects a unit frame having a specific size while being shift at h frame intervals to transmit the selected unit frame to the candidate frame detecting unit 720 to detect a candidate scenecut frame with respect to the selected frame. In this case, the unit frame may be set as n frames. Herein, n and h are real numbers larger than 0. Further, h may be a value smaller than n.

The divided unit image frame is provided to the candidate frame detecting unit 720. The candidate frame detecting unit 720 may include a plurality of frame extracting units 722 and a weight calculating unit 724 connected thereto. Each frame extracting unit 722 receives the unit image frames divided by the image selecting unit 710 and extracts a candidate scenecut frame in each unit image. The frame extracting unit 722 may include a plurality of codecs (an encoding/decoding unit). Alternatively, the frame extracting unit 722 may include a plurality of scenecut detection algorithm executing units. Alternatively, the frame extracting unit 722 may be a combination of the codec and scenecut detection algorithm executing unit.

A scenecut frame candidate in the corresponding unit image is found by the frame extracting unit 722. Here, the candidate frame or the candidate scenecut frame is not finally detected as the scenecut frame, but refers to a frame having a high possibility to be adopted as a final scenecut frame by weight calculation or other algorithm (for example, histogram analysis). A plurality of candidate scenecut frames may be detected in the selected image. In addition, the attributes of the candidate scenecut frames may also be different from each other. For example, one frame may be an I frame, and the other frame may be a frame of the P frame or the B frame of which a ratio of the intra region is higher than a certain threshold value. Herein, the I frame means a frame decoded without referring to another frame through intra prediction, the P frame may be a frame referring to a unidirectional picture, and the B frame may be a frame referring to a bidirectional picture. Further, when the frame extracting unit 722 is the scenecut detection algorithm executing unit rather than the codec, a frame detected through the algorithm may be immediately the candidate scenecut frame.

The frame extracting unit 722 may extract the candidate scenecut frame with respect to the overlapped unit image portion when a part of the unit image is overlapped because the h value is smaller than n.

The frame extracting unit 722 may receive frame time information or frame index information from a predetermined memory (e.g., a frame buffer) for each input frame. Then, after the candidate scenecut frame is extracted through the codec or the scenecut detection algorithm described above, a flag indicating whether the candidate scenecut frame is or not is given or time information or index of the frame selected as the candidate scenecut frame may be displayed and identified on a time line. Through the above method, identification information on the candidate scenecut frame may be shared with other components.

The weight calculating unit 724 multiplies an appropriate weight value by the candidate scenecut frame selected through the frame extracting unit 722. The weight value may be given to each frame calculating unit 724, and the value of the weighted candidate scenecut frame is provided to the final frame detecting unit 730.

The final frame detecting unit 730 may perform a histogram analysis based on the value of the weighted candidate switch frame to detect a candidate frame having a count value higher than the threshold value as a final scenecut frame. Herein, the histogram analysis may be an operation for obtaining summation of the weighted values. In addition, the final frame detecting unit 730 provides a flag to identify the scenecut frame to the final scenecut frame or records the index value of the final scenecut frame to immediately recognize the identified scenecut frame even in other devices below.

Figure 8:
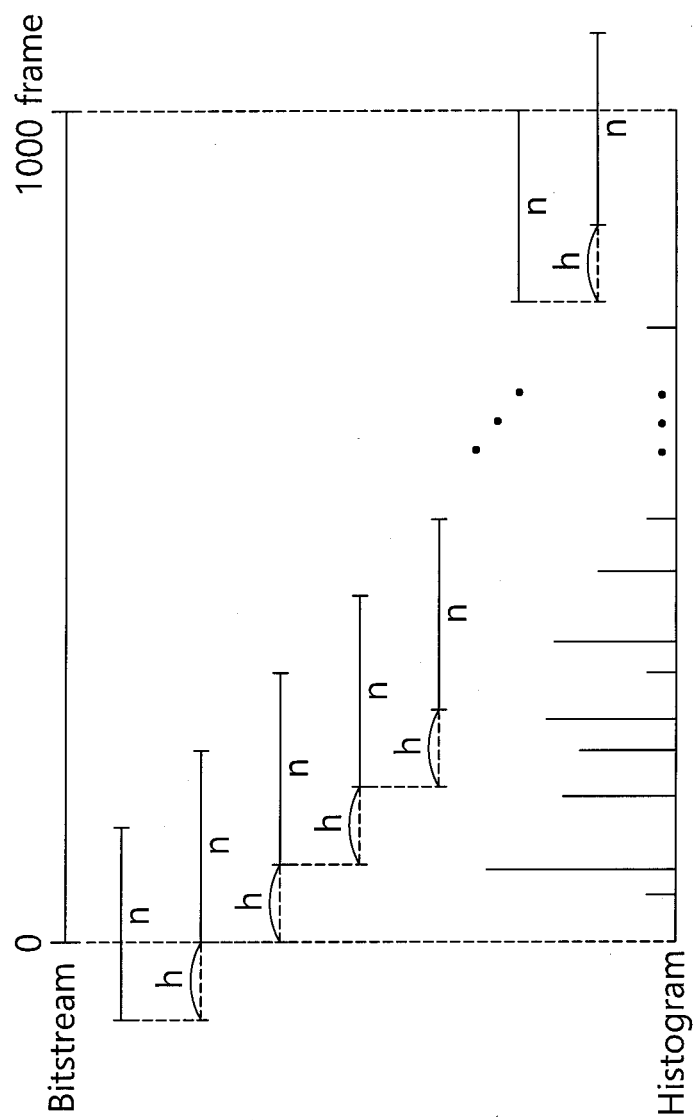
FIG. 8 is a schematic view for describing a process of determining an embedding target frame by selecting a predetermined unit of image frame.

FIG. 8 is a schematic view for describing a process of determining an embedding target frame by selecting a predetermined unit of image frame.

Referring to FIG. 8, an image selecting unit (not illustrated) divides the input bit stream into n units to provide the divided units to a candidate frame detecting unit (not illustrated). Herein, the image selecting unit may include a configuration for shifting the image by h frames and a configuration for selecting only n frames from the front part of the shifted section.

In the embodiment of the present invention, the image selecting unit may divide a bit stream from 0 frame to 1000 frames. Herein, if the decoding is performed at a speed of 50 fps, the above 1000 frames may have a time interval of 20 seconds, and the frame may have respective time information. At this time, h frames may be selected earlier in time with respect to 0 frame which is the first part of the bit stream. That is, n frames are divided and selected from the concept (0-h) frame to provide the divided and selected frame to the candidate frame detecting unit.

Thereafter, the image selecting unit passes the input frame by h frames and divides and selects the n frames again for the subsequent section to provide the selected frame to the candidate frame detecting unit. This process is repeated until it reaches 1000 frames. Even in the end portion of the bit stream, n unit images are selected to exceed 1000 frames through the portion passing through the interval h so that image frames in the bit stream may be selected without omission.

According to the embodiment of the present invention, h is preferably smaller than n. If the h value is larger than n, the frame is shifted when the next image is selected by the h value exceeding the n value, and thus some frames of the bit stream may not be selected. If the h and n values are the same as each other, the duplicated portion is not present and thus a scenecut frame that is not extracted may be present. For example, when the frame is divided in the GOP unit, the first frame of the next unit image may be excluded from the detection target, and thus in spite of the scenecut frame, the frame is not detected. In order to prevent the problem, the present invention may be designed so that the duplicated frame is present, that is, the value h is smaller than the value n, and the scenecut portion may be detected not depending on one codec or scenecut detection algorithm but depending on a plurality of codecs or algorithms.

Accordingly, it may be preferable that the divided and selected unit images may be overlapped with respect to at least one frame. The values h and n may be defined through a user setting. The values h and n may be arbitrarily changed through a user interface (not illustrated). For example, the value n may have values of 60, 120, 240, . . . , and the like. The value h may have values of 10, 20, 7.5, . . . , and the like. In some cases, the value h may be set to a time unit, not a frame unit, and may be set to 0.2 second, 0.4 second, 0.15 second, and the like at 50 fps. That is, the units of h and n are not necessarily the same as each other.

According to the embodiment of the present invention, the value n may be a value representing a specific GOP unit. However, even in this case, the h value may have a different value from the GOP value.

As such, a detailed analysis in the unit frame with respect to the divided image is performed. The h frame moves within the unit frame, and then the image is divided by n frames in the whole frame to search the scenecut frame or the I frame. In this case, the detailed analysis is performed through a plurality of codecs and/or scene transition detection algorithms. The histogram analysis is performed for each frame by multiplying the candidate scenecut frames selected through the codec and/or the scenecut detection algorithm by a weight. The histogram analysis is performed by accumulating all the weight values calculated for each frame using a frame axis and calculating the count value. The count value is calculated for each individual frame and the upper 60% of the specific frame period by applying the threshold value based on the calculated count value, and the corresponding frame may be detected as the final scenecut frame. Alternatively, the threshold value is set as a specific value of 50 to detect the frame having a counter value higher than the threshold value as the final scenecut frame. In this case, the upper percentage ratio and the threshold value for detecting the scenecut frame may be defined through the user setting.

Figure 9:
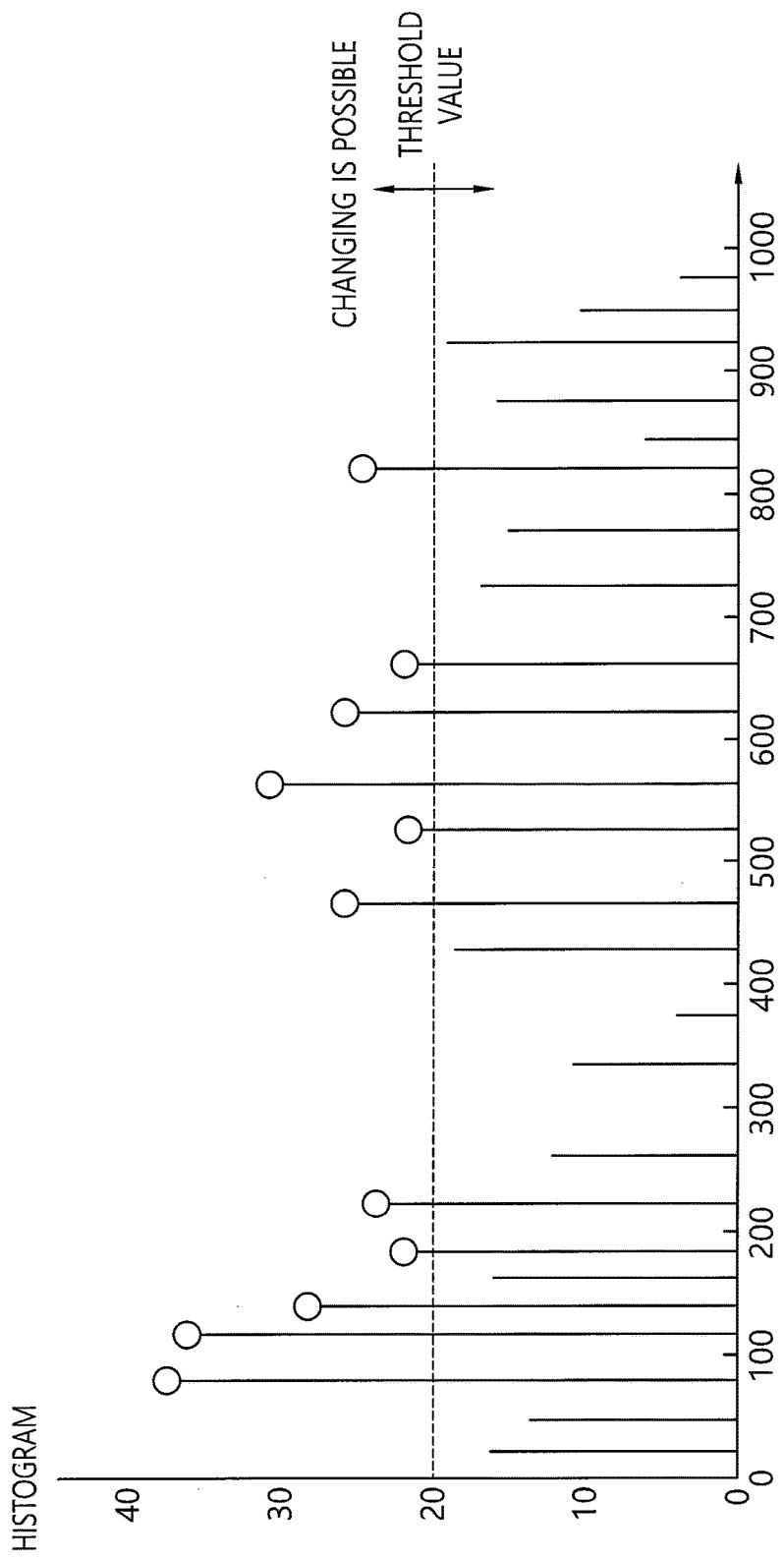
FIG. 9 is a diagram illustrating a histogram analysis result.

FIG. 9 is a diagram illustrating a histogram analysis result.

An example of FIG. 9 may be a history in which a weight calculation result for 1000 frames from 0 to 1000 frames is extracted through the histogram. Herein, if the threshold value is set to 20, a frame having a count value higher than 20 (indicated by 'o' in the drawing) may be detected as a final scenecut frame. In this case, the threshold value is not necessarily fixed to 20 as one count value, but can be arbitrarily changed through the user interface. In addition, the specific count value is not set as the threshold value and a frame having an upper count value within a specific interval such as the upper several % may be detected as a final scenecut frame.

According to the embodiment of the present invention, a flag for identifying the final scenecut frame detected as described above is allocated, or upper frame index information (alternatively, time information) may be stored through a table or other data storage means for managing the frame. Through the index information, the watermark embedding apparatus may identify the scenecut frame and/or the I frame, and may select the watermark embedding target frame based on the identified frame. The selected frame may be forcibly encoded as the B frame.

Simulation Result

FIG. 10 is a table comparing a change in capacity through type conversion of an I frame and the subsequent frame by a watermark embedding method according to an embodiment of the present invention.

Referring to FIG. 10, the capacity change between two frames changing the frame type is substantially similar to the capacity before the type of each frame is changed. In the simulation, it was verified that the robustness of the watermark from the external attack may be secured more efficiently while minimizing the increase of the capacity of the watermark-embedded frame through the method of forcibly converting the I frame embedded with the watermark into the B frame.

FIG. 11 is a table for comparing a capacity variation of an image in which a watermark is embedded and an original image by the watermark embedding method according to the embodiment of the present invention.

Referring to FIG. 11, in order to test the robustness of the watermark embedding method according to an embodiment of the present invention, a test was performed on a sample image provided freely. The size of the original image is 1920×800 and the bit rate is 6M. The file size of this image is 494 MB. The table in FIG. 11 illustrates the capacity due to the frame variation. The capacity of the image was increased (about 9 MB) enough to have no load on the system for transmitting the image data. Therefore, it can be verified that the robustness may be maximized without imposing a burden on the size of the watermarked image in the case of using the watermark embedding method according to the embodiment of the present invention.

The present invention has been described with reference to the preferred embodiments of the present invention. However, it will be appreciated by those skilled in the art that various modifications and changes of the present invention can be made without departing from the spirit and the scope of the present invention which are defined in the appended claims and their equivalents.

What is claimed is:

1. A watermark embedding method comprising:
inputting an original bitstream;
determining a first frame for embedding a watermark in the inputted original bitstream;
selecting one of a plurality of frames as a second frame, wherein the second frame is positioned after the first frame;
converting a frame type of the first frame from a non-bidirectional-coded frame to a bidirectional-coded frame (B frame),
wherein the B frame is referring to the second frame;

generating a reference relationship for the second frame as a reference frame of the first frame; and embedding the watermark in the first frame, which is converted to the B frame.

2. The watermark embedding method of claim 1, wherein the generating the reference relationship for the second frame comprises converting a frame type of the second frame to an intra-coded frame (I frame).

3. The watermark embedding method of claim 1, wherein the first frame is a scenecut frame or the I frame in the original bitstream.

4. The watermark embedding method of claim 1, wherein in a group of picture (GoP) structure changed by changing the reference relationship of the first frame and the second frame, the first frame, which is converted to the B frame refers to the second frame in another GoP by activating a function to refer to another GoP.

5. The watermark embedding method of claim 1, wherein, when the frame type of the first frame is converted to the B frame, the GoP structure is changed so that the first frame, which is converted to the B frame belongs to a first GoP which is the previous GoP of a second group of picture (GoP) to which the first frame belongs in the original bitstream.

6. The watermark embedding method of claim 5, wherein the GoP structure is changed by changing and setting the first GoP to the extent of a frame immediately before the second frame.

7. The watermark embedding method of claim 1, wherein the second frame is positioned immediately after the first frame.

8. The watermark embedding method of claim 1, wherein the determining of the first frame for embedding the watermark in the inputted original bitstream includes the steps of:

selecting input image frames in the inputted original bitstream by a unit of n frames while shifting the input image frames with an interval of h frames;

extracting a candidate frame of the selected n frames by using at least one of a plurality of codecs and scenecut detection algorithms;

detecting a frame having a count value larger than a threshold value as a final scenecut frame through histogram analysis based on the detected candidate frame; and determining the detected final scenecut frame as the first frame, wherein h and n are real numbers larger than 0, and h has a smaller value than n.

9. A watermark embedding apparatus comprising:

an input unit for inputting an original bitstream;

an embedding frame determining unit for determining a first frame for embedding a watermark in the inputted original bitstream;

a reference frame selecting unit for selecting one of a plurality of frames as a second frame, wherein the second frame is positioned after the first frame;

a frame changing unit for converting a frame type of the first frame from a non-bidirectional-coded frame to a bidirectional-coded frame (B frame), wherein the B frame is referring to the second frame;

a reference frame generating unit for generating a reference relationship for the second frame as a reference frame of the first frame; and a watermark embedding unit for embedding the watermark in the first frame, which is converted to the B frame.

10. The watermark embedding apparatus of claim 9, wherein the reference frame generating unit further converts a frame type of the second frame to an intra-coded frame (I frame).

11. The watermark embedding apparatus of claim 9, wherein the first frame is a scenecut frame or the I frame in the original bitstream.

12. The watermark embedding apparatus of claim 9, wherein in a group of picture (GoP) structure changed by changing the reference relationship of the first frame and the second frame, the first frame, which is converted to the B frame refers to the second frame in another GoP by activating a function to refer to another GoP.

13. The watermark embedding apparatus of claim 9, wherein, when the frame type of the first frame is converted to the B frame, the GoP structure is changed so that the first frame, which is converted to the B frame belongs to a first GoP which is the previous GoP of a second group of picture (GoP) to which the first frame belongs in the original bitstream.

14. The watermark embedding apparatus of claim 13, wherein the GoP structure is changed by changing and setting the first GoP to the extent of a frame immediately before the second frame.

15. The watermark embedding apparatus of claim 9, wherein the second frame is positioned immediately after the first frame.

16. The watermark embedding apparatus of claim 9, wherein the embedding frame determining unit further includes;

an image selecting unit for selecting input image frames in the inputted original bitstream by a unit of n frames while shifting the input image frames with an interval of h frames, a candidate frame extracting unit for extracting a candidate frame of the selected n frames by using at least one of a plurality of codecs and scenecut detection algorithms, and a final frame detecting unit for detecting a frame having a count value larger than a threshold value as a final scenecut frame through histogram analysis based on the detected candidate frame, the detected final scenecut frame is determined as the first frame, wherein h and n are real numbers larger than 0, and h has a smaller value than n.

\* \* \* \* \*